United States Patent
Swaminathan et al.

(10) Patent No.: US 6,460,086 B1
(45) Date of Patent: Oct. 1, 2002

(54) METHOD AND APPARATUS FOR DELIVERY OF A BYTECODE EMBEDDED WITHIN A TRANSPORT STREAM

(75) Inventors: Viswanathan Swaminathan, Fremont; Gerard Fernando, Mountain View; Raghuveer Pallikonda, Santa Clara, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/203,551

(22) Filed: Dec. 1, 1998

(51) Int. Cl.[7] .............................................. G06F 15/16
(52) U.S. Cl. ...................................... 709/236; 709/231
(58) Field of Search ................................ 709/217–219, 709/203, 245, 249, 231, 236, 230; 348/465; 386/83

(56) References Cited

U.S. PATENT DOCUMENTS

| 5,650,825 A | * | 7/1997 | Naimpally et al. ......... 348/465 |
| 5,768,539 A | | 6/1998 | Metz et al. |
| 5,790,753 A | * | 8/1998 | Krishnamoorthy et al. . 709/203 |
| 5,978,855 A | * | 11/1999 | Metz et al. .................. 709/249 |
| 6,212,327 B1 | * | 4/2001 | Berstis et al. .................. 386/83 |

FOREIGN PATENT DOCUMENTS

| EP | 0 967 547 | 12/1999 |
| WO | WO 98/43415 | 10/1998 |

OTHER PUBLICATIONS

A. Eleftheriadis et al., International Organization for Standardization Coding of Moving Pictures and Audio, ISO/IEC M3517, Jul. 1998, 9 pages.*

S. Dutta et al., Smart Video Streams: 101 uses of the User Data Field in MPEG, Proceedings of ASILOMAR–29, 1996, pp. 1462–1466.*

L. Atzori et al., Private Data Broadcasting Using Digital TV and MPEG–2 Transport Stream, IEEE IPA97, Jul. 1997, pp. 453–457.*

Mornington–West, A., "*MHEG–5 and Java—the Basis for a Common European API?*", EBU Technical Review—Spring 1998, pp. 11–15, European Broadcasting Union, Brussels.

* cited by examiner

*Primary Examiner*—Patrice Winder
(74) *Attorney, Agent, or Firm*—The Hecker Law Group

(57) ABSTRACT

A method and apparatus for embedding of bytecode data in a transport stream is described. Embodiments of the invention serve to make Java™ bytecode (in a class file) concurrently available to a user that is receiving media information through a transport stream. To ensure the concurrent delivery of bytecode, the information is embedded within spaces allocated in the transport stream, or in packets that carry the media data. In one embodiment of the invention, media data is grouped in structured packets referred to as Packetized Elementary Stream (PES) packets. Predefined spaces are available in each PES packet where bytecode data is embedded. In one embodiment of the invention the pre-defined space is allocated within the header segment of a PES packet. In another embodiment bytecode instruction are embedded within a private stream segment of a PES packet. One transport stream used with the invention is an MPEG-2 transport stream that includes structured packets that transport the PES packets. These transport stream packets, in turn, have within them pre-defined spaces. Bytecode data can also be embedded within spaces available in the transport stream. In an embodiment of this invention bytecode can be embedded in a transport stream header or a transport stream payload segment. In other embodiments, bytecode data is transmitted in the private stream segment and retransmission of bytecode data is accomplished in other regions of the PES packet. In another embodiment, bytecode data is transmitted in an adaptation field and retransmitted data is sent as PES header private data.

21 Claims, 6 Drawing Sheets

METHOD AND APPARATUS FOR DELIVERY OF A BYTECODE EMBEDDED WITHIN A TRANSPORT STREAM

BACKGROUND OF THE INVENTION

A. Field of the Invention

This invention relates to the field of data communications. Portions of the disclosure of this patent document contain material that is subject to copyright protection.

The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, SPARC, "Write Once, Run Anywhere", Java, JavaOS, JavaStation and all Java-based trademarks and logos are trademarks or registered trademarks of Sun Microsystems, Inc. in the United States and other countries.

B. Background Art

One use of the Internet is to deliver media information (such as a movie or sound file) to a user. A problem with current media delivery schemes is that it is difficult to deliver any other data while the media data is being sent. Sometimes it is desired to send media data and other data (like control data) at the same time, a process referred to as "concurrent delivery". Right now there is no suitable scheme for concurrent delivery of media and control data. The problems associated with providing concurrent delivery of media data and control data can be understood by reviewing media delivery systems.

Media Delivery

In multimedia applications media data such as video or audio information is communicated from a server computer to a client computer (e.g. a user's computer at home or office) via a "transport stream". A transport stream consists of a series of bursts or packets of media data. Before the media data is transmitted, it is first prepared by converting it into a suitable format for transmission. A number of schemes (e.g., Motion Picture Experts Group (MPEG) standards, such as MPEG-1, MPEG-2, MPEG-4, etc.) are available for preparing media data (e.g., audio, video, etc.) for transmission as a media transport stream.

Media data is sometimes referred to as "time aware" or "time sensitive" data. This is because it is important or required that data be available at a certain rate and/or at a certain time. For example, when viewing a video stream, it is important that new video frames be available as needed to prevent gaps or choppiness in displayed video data. If the data of a movie is being sent too slowly, for example, the displayed movie image may a freeze or go blank while the client computer waits for new movie data. Similarly, for audio data, new audio data must be provided continuously or there will be gaps during playback. These gaps may cause silence in the playback of the audio, causing the sound to be clipped or missing sounds and words. (Note that time aware data is not limited to media data. Time aware data is data that carries with it additional information representing timing relevant to the use of the data. For example, time aware data could include time stamps indicating deadlines by which the data should be processed).

In some circumstances, a control application is required, to help play back the media data or to control the playback of the media data. In some cases such a control application is an applet or an application (such as a Java™ programming language applet or application). The applet or application is transmitted as bytecode from a server to a client and the client uses the applet or the application, for example, to control the playback of the media data. Bytecode or other serialized data or objects may need to be delivered to clients concurrently with the media information.

There is presently no effective mechanism available for delivery of bytecode instructions concurrently with media data. Typically, bytecode data is transported after all necessary media data is transmitted. That may be too late for some environments, where applets or control applications need to be processed as soon as they become available. One prior art solution is to send the control application first, prior to transmitting the media or time aware data. However, this leads to unwanted delays in playback of the media data. The user is expecting to see video data, but instead has to wait until the control data is received. This delay is undesirable.

Therefore, there is a need for transport of bytecode instruction concurrently with media data rather than prior to or subsequent to transport of the media information.

SUMMARY OF THE INVENTION

A method and apparatus for embedding of bytecode data in a transport stream is described. Embodiments of the invention serve to make Java™ bytecode (in a class file) concurrently available to a user that is receiving media information through a transport stream. Bytecode information is embedded within spaces allocated in the transport stream, or in packets that carry the media data.

In one embodiment of the invention, media data is grouped in structured packets referred to as Packetized Elementary Stream (PES) packets. Bytecode data is embedded in predefined spaces in each PES packet. In one embodiment of the invention the pre-defined space is allocated within the header segment of a PES packet. In another embodiment bytecode instructions are embedded within a private stream segment of a PES packet.

In other embodiments, bytecode data is transmitted in the private stream segment and retransmission of bytecode data is accomplished in other regions of the PES packet. In another embodiment, bytecode data is transmitted in an adaptation field and retransmitted data is sent as PES header private data.

One transport stream used with the invention is an MPEG-2 transport stream that includes structured packets that transport the PES packets. These transport stream packets, in turn, have within them bytecode data embedded within spaces in the transport stream. In an embodiment of this invention bytecode can be embedded in a transport stream header or a transport stream payload segment.

In embodiments of the invention, the embedding of information under the methods of this invention is accomplished so that an MPEG-2 compliant decoder is able to use the stream irrespective of whether or not the decoder takes advantage of the embedded bytecode information. Further, the transport stream is transmitted with minimum changes in bit-rate in terms of both length and frequency and is within the allowed maximum bandwidth. Embodiments of this invention may also define tune-in points at which a decoder can start decoding and presenting bytecode information.

DETAILED DESCRIPTION OF THE INVENTION

The invention provides a method and apparatus for embedding bytecode data within a transport stream. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

This invention is described in connection with the transmission of media data to a client computer system. However, this is by way of example only. The invention has equal application to any device that can receive data, including set top boxes, personal digital assistants, smart appliances, telcom devices, financial terminals, or any other such device. In addition, the invention is not limited to media data, but has equal application to any form of data, including data related to electronic commerce.

Bytecode Data Transport In Media Data Transport Stream

The current invention provides for the concurrent delivery of media data and byte code data via a media data transport stream. The invention provides for embedding bytecode data in predefined spaces in the transport stream. When received, the bytecode data can be separated out and used to support playback or control of the received media data.

One existing technique known to the inventors for timely delivery of media streams is a method described in an application filed with the United States Patent Office, titled METHOD AND APPARATUS FOR TIMELY DELIVERY OF A BYTECODE AND SERIALIZED OBJECTS STREAM, filed Jun. 26, 1998, application Ser. No. 09/105, 963, incorporated by reference herein. The current method for delivery of bytecode information embedded in a transport stream can take advantage of a stream that has become time aware by the method disclosed in the aforesaid application.

In the present invention, the bytecode is embedded within the transport stream in such manner that the transfer rate frequency and maximum length remain stable. Bytecode information is imbedded in the transport stream such that a decoder is able to decode the media data portion of the stream even if the decoder cannot take advantage of the embedded bytecode information. In one embodiment of the invention the bytecode data is embedded in a media transport stream encoded using the MPEG-2 protocol. This embodiment is described below.

MPEG-2

Although the present invention has equal applicability to any type of transport stream, the invention is described by way of example in connection with transmission as part of an MPEG-2 transport stream.

Figure 3:
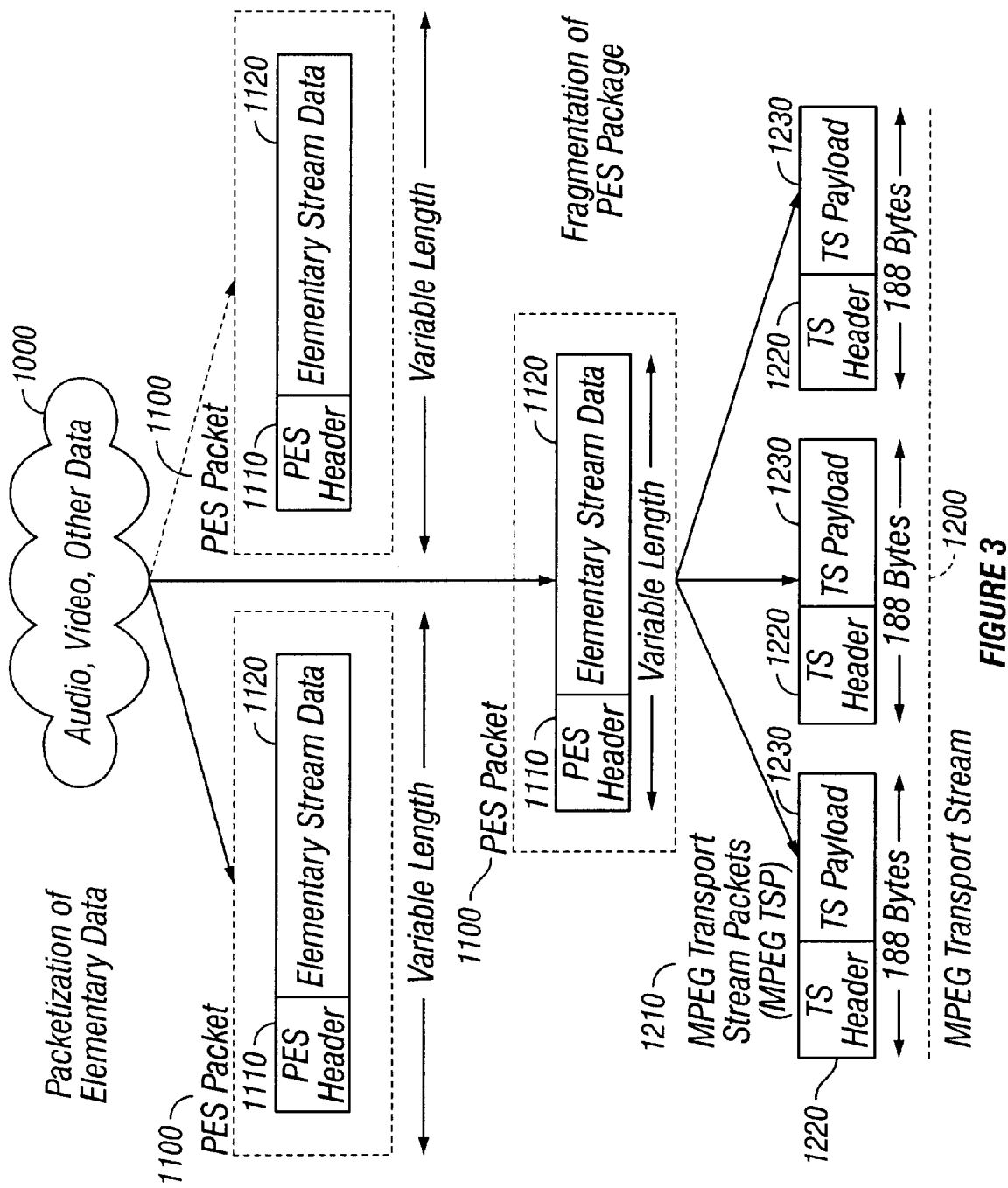
FIG. 3 is a diagram illustrating a method of packetization, fragmentation, and transport of data according to one embodiment of the invention.

FIG. 3 is a diagram illustrating the process by which media data is transported through an MPEG-2 transport stream. The stream is comprised of transport stream packets (TSPs) that consist of a header and a data storage segment. The header also referred to as transport stream header (TS header) may include an optional "adaptation field". The data storage segment also referred to as transport stream payload (TS payload) is comprised of packetized elementary stream (PES) packets. Each PES packet consists of a PES header and elementary stream data.

The transport stream is shown in FIG. 3 from the perspective of a data source converted into PES packets and assembled into TSP packets. There is a source 1000 of media data, such as audio, video, image or other data that is to be transmitted to a client computer. To do this, media data 1000 is placed into one or more variable sized packages, referred to as Packetized Elementary Stream (PES) packets 1100. Each PES packet consists of two regions, a header region and a data region. The PES header 1110 is followed by "elementary stream data" 1120.

PES Header Region

The header region contains a PES header 1110. The PES header 1110 identifies the attributes of the data stored in the data region. Such attributes may include the type of data, the size of the data being transmitted, the start and end locations of the transmitted data, and possibly other information needed for interpretation of the transmitted data. For example, one embodiment of a PES header 1110 can comprise information representing the length of the header, the version, a flag denoting a class or an object, the number of required classes, a "start loading" time stamp, a "load by" time stamp, the size of the class, the type of compression being used, the type of security scheme being used, the type of error correction being used, other type information, the length of a class identifier (ID), a class identifier (ID), lengths of class ID's for each of the required classes, and class IDs for each of the required classes.

Media Data Region

The elementary stream data 1120 region contains elementary media data. The elementary data 1000 consists of all or a portion of the source data (i.e. audio data, video data). The data may be compressed with appropriate identifying information in the PES Header 1110 for decompressing the elementary stream data 1120 (as needed).

Transport Stream

As noted above, the transport stream consists of TSP packets that consists of a header and a data storage segment. MPEG-2 transport stream 1200 is a multiplexed bit stream and a collection of individual MPEG-2 transport stream packets (MPEG-2 TSP) 1210. Each MPEG-2 TSP 1210 is of fixed length of 188 bytes, and includes a transport stream header (TS header) 1220 followed by a data storage segment (TS payload) 1230. (The TS payload consists of PES packets 1100).

TS Header 1220

The TS header contains information needed to receive and decode the MPEG-2 TSP's 1210. All the transport stream packets begin with the transport stream header (32 bits). This transport stream header contains a 13-bit Packet ID (PID) as shown in Table 1 below. Transport Stream packets of a single PID carry data of one and only one elementary stream. The PID identifies, via Program Specific Information (PSI) tables, the contents of the data contained in the Transport Stream packet. There are four PSI tables carried in the Transport Stream namely, Program Association Table (PAT), Program Map Table (PMT), Conditional Access Table (CAT), and Network Information Table (NIT). These tables contain the necessary information to demultiplex and present programs.

A program here is a collection of elementary streams which are to be presented synchronously. The program_number is the numeric label associated with a program. The program definition is carried as transport stream packets containing the program map table of that program. The Program Map Table, specifies among other information, which PIDs, and therefore which elementary streams are associated to each program. The Program Association Table provides the correspondence between a program_number and the Program Map Table. PMT also indicates the PID of the Transport Stream packets which carry the PCR (Program Clock Reference) for each program. The Conditional Access Table contains the scrambling information and the Network Information Table may give the network information, but its content is not defined by the standard.

TABLE 1

Transport Packet Syntax

| Syntax | No. of bits |
|---|---|
| sync_byte | 8 |
| transport_error_indicator | 1 |
| payload_unit_start_indicator | 1 |
| transport_priority | 1 |
| PID | 13 |
| transport_scrambling_control | 2 |
| adaptation_field_control | 2 |
| continuity_counter | 4 |

Adaptation Field

As noted above, the transport stream header may include an optional adaptation field. The Adaptation field control bits in the TSH indicate whether or not there is an adaptation field and/or a payload. The adaptation field control values are described by Table 2 below:

TABLE 2

Adaptation Field Control Values

| Value | Description |
|---|---|
| 00 | Reserved for future use by ISO/IEC |
| 01 | No adaptation_field, payload only |
| 10 | Adaptation_field only, no payload |
| 11 | Adaptation_field followed by payload |

The adaptation field, when present, is described in Table 4 below:

TABLE 3

Transport Stream Adaptation Field (partial)

| Syntax | No. of bits |
|---|---|
| adaptation_field_length | 8 |
| if(adaptation_field_length> 0){ | |
|   discontinuity_indicator | 1 |
|   random_access_indicator | 1 |
|   elementary_stream_priority_indicator | 1 |
|   PCR_flag | 1 |
|   OPCR_flag | 1 |
|   splicing_point_flag | 1 |
|   transport_private_data_flag | 1 |
|   adaptation_field_extension_flag | 1 |
|   if(transport_private_data_flag=='1'){ | |
|     transport_private_data_length | 8 |
|     for(i=0; i<transport_private_data_length;i++){ | |
|       private_data_byte | 8 |
|     } | |

TABLE 3-continued

Transport Stream Adaptation Field (partial)

| Syntax | No. of bits |
|---|---|
| } | |
| for(i=0; i<N; i++) | |
|   stuffing_byte; | 8 |

PES Packet

The PES Packet has the following structure as shown in Table 4:

TABLE 4

PES Packet (partial)

| Syntax | No. of bits |
|---|---|
| packet_start_code_prefix | 24 |
| stream_id | 8 |
| PES_packet_length | 16 |
| if(stream_id!= program_stream_map | |
|   && stream_id!= padding_stream | |
|   && stream_id!= private_stream2 | |
|   && stream_id!= ECM | |
|   && stream_id!=EMM | |
|   && stream_id!= program_stream_directory | |
|   && stream_id!=DSMCC_stream | |
|   && stream_id!=ITU-T Rec. H.222.1 type E stream){ | |
|     '10' | 2 |
|     PES_extension_flag | 1 |
|   if(PES_extension_flag == '1'){ | |
|     PES_private_data_flag | |
|     if(PES_private_data_flag == '1'){ | |
|       PES_private_data | 128 |
|     } | |

Private Data

The MPEG-2 transport stream is capable of carrying user data. The user data can be stuffed as private data in the adaptation field of the transport header of a packet. It can be delivered as a private elementary stream of a program. It can also be delivered as private data in the PES header of the transport stream. The MPEG-2 also allows private data to be sent in Transport Stream packets with a PID value designated as a Program Map Table PID in the Program Association Table.

The present invention includes embodiments that take advantage of the ability to deliver private data in a transport stream to embed bytecode for deli very.

Embedding Bytecode Data

Transport of bytecode and other user data in the MPEG-2 transport stream is accomplished by embedding the data in different segments of the packets. Embodiments include (1) embedding data as private data in the adaptation field 1222 of TS header 1220 (i.e., header) of an MPEG-2 TSP 1210, (2) embedding data as private data in the TS payload 1230 (i.e., data storage segment) of an MPEG-2 TSP 1210, (3) transporting data as a private elementary stream included in PES header 1110 of a PES packet 1100 and, (4) transporting data using a combination of the above enumerated methods.

1. Adaptation Field Method

Figure 4:
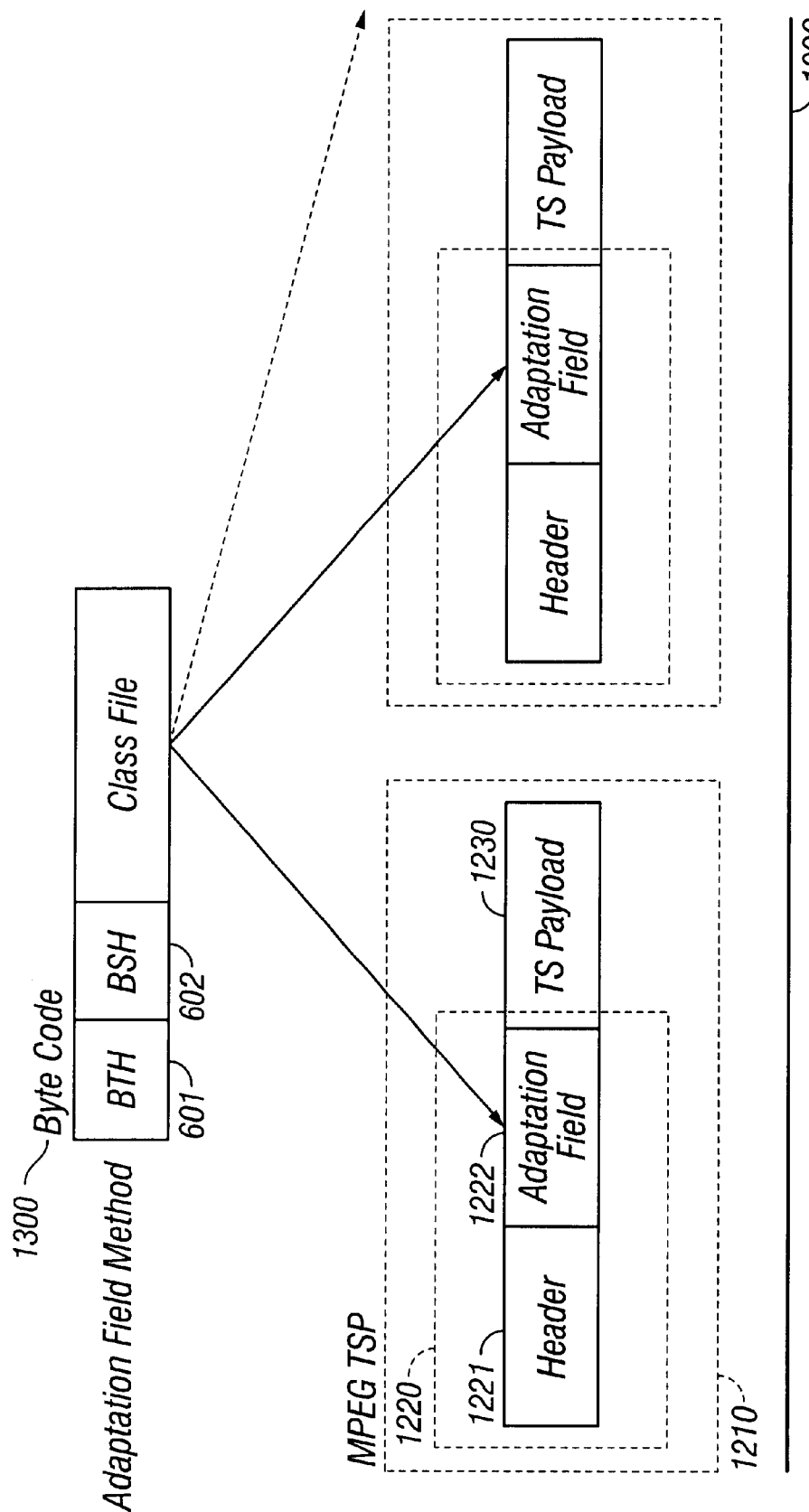
FIG. 4 illustrates a method of embedding bytecode data within the adaptation field of a packet according to one embodiment of the invention.

As illustrated in FIG. 4, in an embodiment of the invention, bytecode data can be packaged as private data in the adaptation field 1222 (included in header 1220) of an MPEG-2 TS packet. To maximize the data in each packet, MPEG-2 TS packets 1210 may be sent with no TS payload 1230. When the adaptation_field_control field is 10 the adaptation field 1222 length will be 183 bytes. A total of 181 bytes of bytecode data may be embedded in such an MPEG-2 TS packet 1210. Because the packet length is fixed to a maximum of 188 bytes in this embodiment of the invention, the bit rate remains constant and retransmission and tune-in times can be computed.

The PCR PID Transport Stream packets that contain the PCR information of a program have a minimum normative rate. This defines the maximum interval of these PCRs in the stream. However, additional packets carrying bytecode data can be inserted as PCR PID packets. These packets are introduced at a rate calculated using a Tune-in time and the bandwidth required for the bytecode data stream. When the adaptation-field_control flag is '10, the value of the adaptation_field_length shall be 183 (4 bytes for the rest of the transport stream header and 1 byte for the adaptation_field_length). A total of 181 bytecode data bytes can be sent in such a packet as 1 byte is used for other adaptation field flags and the private data length is specified using 1 byte.

Referring again to FIG. 4, the bytecode packets begin with a bytecode transport header 601 and a bytecode stream header 602. In an embodiment of this invention a bytecode transport header 601 may contain the following data:

Version (V) (2 bits),

Future Use (2 bits)

Next Tune-in time (64 bits)

Next Retransmission time (60 bits)

"Next tune in time" is the next tune-in point from where a decoder can start decoding. This marks the beginning of the retransmission of all the classes/objects necessary for a session. In an MPEG-2 implementation this time is measured in ticks of a 90 megahertz clock. The number of ticks are measured from the beginning of the session. All zeros are used to indicate hat the tune-in time is undefined.

Next retransmission time is the time of the next retransmission for a lass/object. This time is measured in ticks of a 90 Megahertz clock. All zeros are used to indicate that the tune-in time is undefined. This field is made for 32 bit alignment. This reflects the next retransmission of the TS payload 1230 in the same channel. If the normal and retransmission channels are different, a class file may be retransmitted in the normal channel for tune-in at a time earlier than the next retransmission time.

2. Payload Method

The user data can also be sent as a private elementary stream of a program. MPEG-2 permits two private elementary stream types, Private_Stream1/Private_Stream2. These differ in the format of the PES header carried in these streams.

Figure 5:
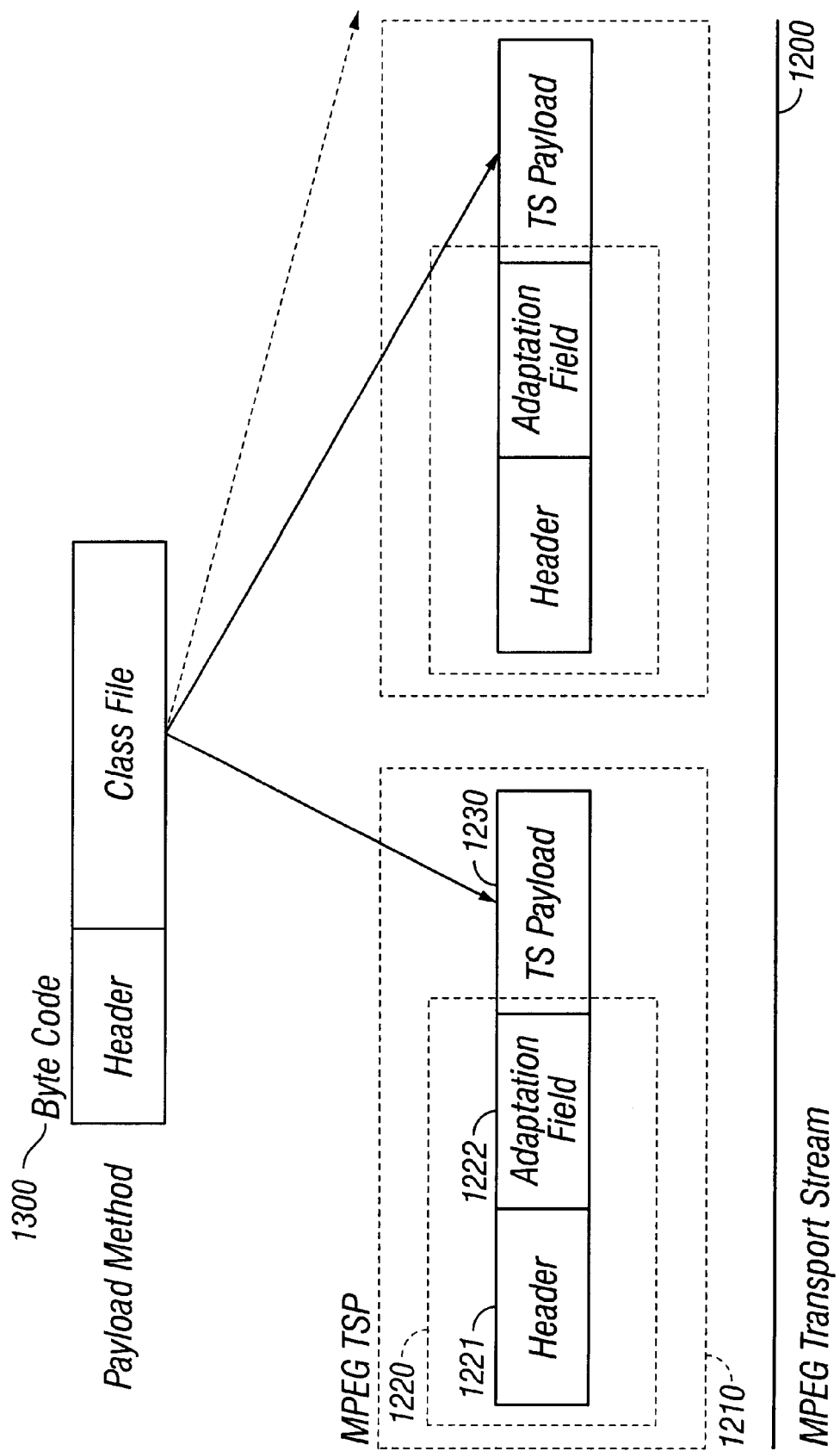
FIG. 5 illustrates a method of embedding bytecode within the payload segment of an MPEG-2 transport stream packet according to one embodiment of the invention.

The bytecode data can be sent as private data of type Private_Stream2 with a Java Stream Header or any other equivalent as the private stream PES header. As illustrated in FIG. 5, in another embodiment of the invention, bytecode data can be packaged as data in the TS payload 1230 (data storage segment) of an MPEG-2 TS packet. Where insufficient elementary stream data 1120 are available to be defragmented into the TS payload 1230 segment of the MPEG-2 transport stream 1200, bytecode data can be substituted instead.

3. PES Header Method

The MPEG-2 PES format for the elementary streams of certain stream types have fields for private data to be sent in the PES Header. Sixteen bytes of bytecode data can be sent as private data in each PES header when the PES_private data flag is set in the PES header. The PES headers appear only at the beginning of a PES packet and each PES packet is split into multiple transport stream packets. Therefore, not all the transport stream packets of that PID carry PES headers. This technique of delivering user data can be used when the information to be sent does not require much bandwidth. In this case, the bit rate may change slightly.

Figure 6:
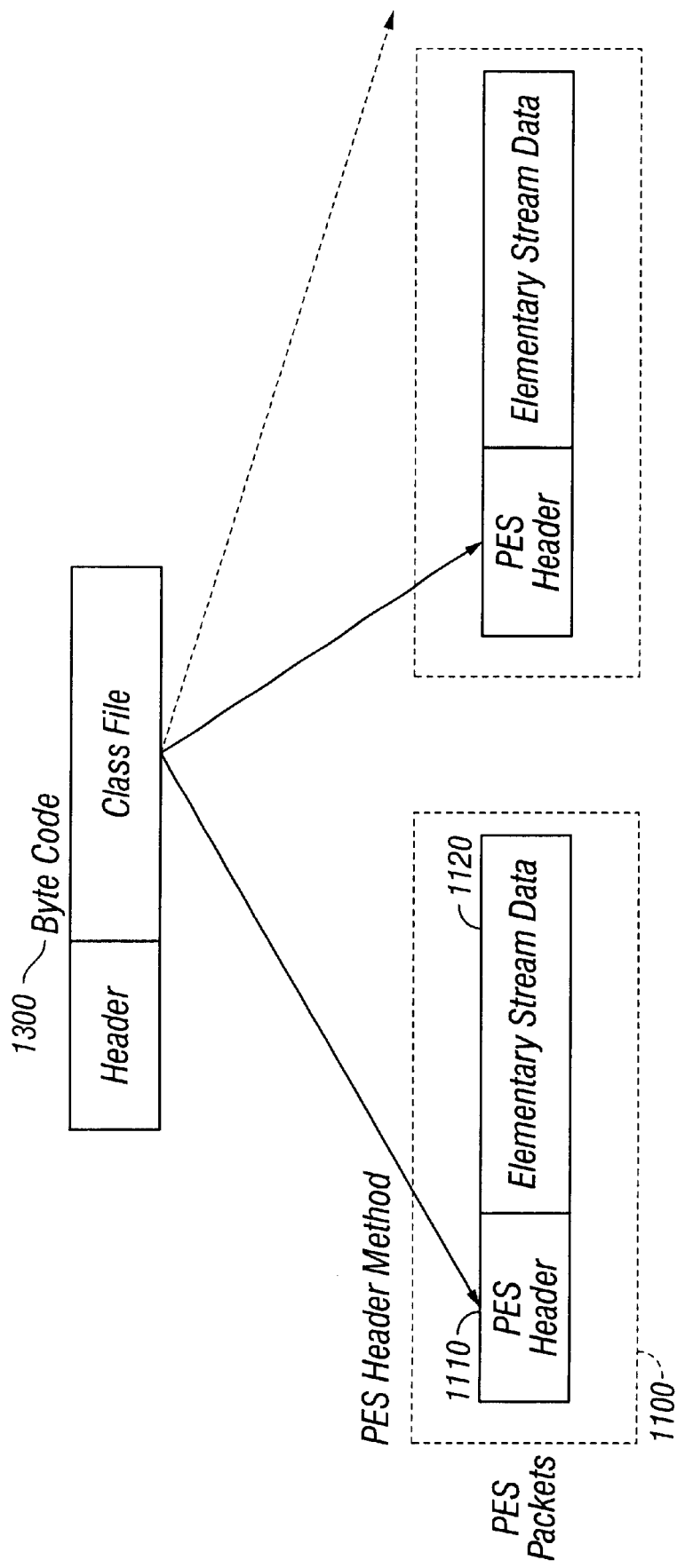
FIG. 6 illustrates bytecode data embedded within the PES header of a PES packet.

As illustrated in FIG. 6, bytecode data is embedded within the PES header 1110 of a PES packet 1100. The MPEG-2 PES format for the elementary streams of certain stream types have fields for private data to be sent in the PES header 1110. Sixteen (16) bytes of Bytecode data can be transported as private data in each PES header 1110 when the PES_private data flag is set.

PES headers 1110 appear only at the beginning of a PES packet 1100. As a part of fragmentation of the PES packets 1100, each packet is split into multiple MPEG-2 TS packets 1210. Therefore, not all the MPEG-2 TS packets 1210 within the MPEG-2 transport stream 1200 may carry a PES header 1110.

4. Hybrid Methods of Bytecode Data Transport for Transmission and Retransmission In other embodiments of the invention, a combination of the aforesaid methods may be used. The combination techniques provide opportunity for retransmission of bytecode data without affecting the delivery rate of the originally transmitted bytecode data or of the media data.

The transport stream multiplexer maintains a constant rate at which the packets are delivered. The transport stream packets which carry the PES packets and other information are stuffed with bytecode data using predefined stuffing bytes in the adaptation field to maintain a constant bit rate. Stuffing is also done when there is insufficient PES packet data to completely fill the transport stream packet payload bytes. In this method, the normal transmission of bytecode data is done using the private stream method (described above) while the retransmission of the same bytecode data can be achieved by replacing the above mentioned stuffing bytes. The retransmission is thus achieved at zero bandwidth increase and the bit rate can be maintained constant.

Another technique employs the adaptation field method for normal transmission of the bytecode data. The retransmission of the same bytecode data is sent as the PES header private data. The normal transmission is done in the adaptation field to ensure that all the data can be sent at a fixed rate. The retransmission is done using the PES header so that the bandwidth is not increased considerably.

Another scheme combines the private stream technique and the PES header technique. The retransmission of bytecode data is done as the PES header private data as in the above technique but the normal transmission of bytecode data is done using the private stream method.

Error Correction

The hybrid schemes described above provide the ability for retransmission. Because loss of any transport stream packet may result in corruption of the bytecode data, a retransmission policy is implemented to resubmit any lost packets. One possible approach involves retransmission of the entire class at regular intervals in the absence of a back channel. This helps to facilitate random access points in the case of media. However, this may not be possible when the number of clients is too high or when the class (or object) is very large, making retransmission prohibitive.

When a back channel is present packet loss can be signaled to the server, and the lost packet can be retransmitted. When a reliable multicast scheme is used, the data can also be retransmitted from places other than the server.

There are a number of error resilient schemes with built in redundancy available for recovering from a partial packet loss. For example, schemes like forward error correction can be used. The packet loss problem can also be partially solved by using some reliable multicast scheme. Embodiments of the invention facilitate the use of any error resilience or any reliable multicast algorithm to overcome packet loss.

The environment that provides the means for operation of the methods of this invention includes embodiments in forms of hardware systems, software components, and data structures that can be understood by considering the following description. Reviews of a hardware embodiment, object oriented programming, and the Java™ programming language are provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance where a subclass is limited to inheriting the class definition of only one parent class. The Java™ programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

An object is a generic term that is used in the object-oriented programming environment to refer to a module that contains related code and variables. A software application can be written using an object-oriented programming language whereby the program's functionality is implemented using objects.

Java™ Programming and Execution

A Java™ program is composed of a number of classes and interfaces. Unlike many programming languages, in which a program is compiled into machine-dependent, executable program code, Java™ classes are compiled into machine independent bytecode class files. Each class contains code and data in a platform-independent format called the class file format. The computer system acting as the execution vehicle contains a program called a virtual machine, which is responsible for executing the code in Java™ classes. The virtual machine provides a level of abstraction between the machine independence of the bytecode classes and the machine-dependent instruction set of the underlying computer hardware. A "class loader" within the virtual machine is responsible for loading the bytecode class files as needed, and either an interpreter executes the bytecodes directly, or a "just-in-time" JIT) compiler transforms the bytecbdes into machine code, so that they can be executed by the processor.

Sample Java™ Network Application Environment

Figure 1:
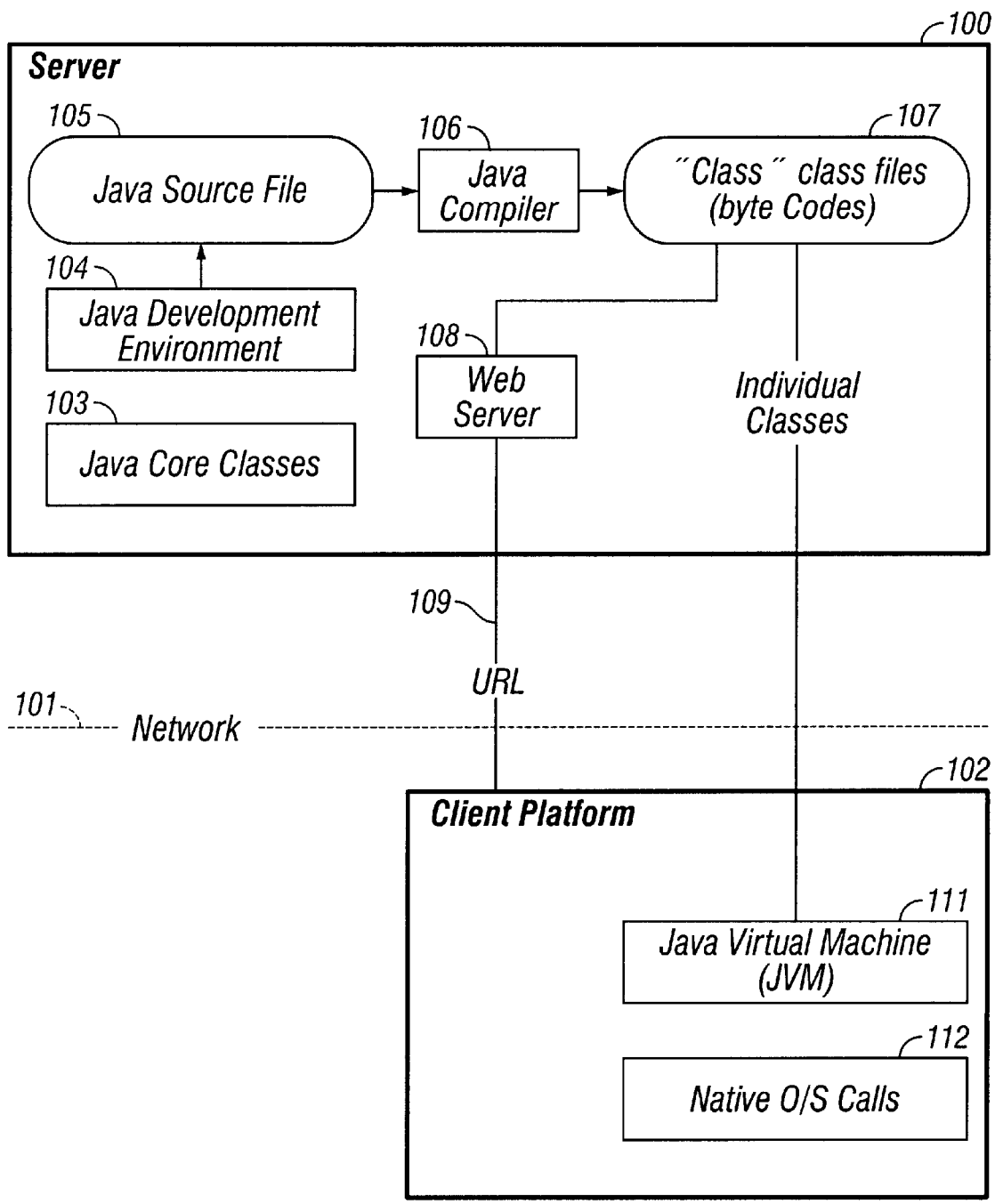
FIG. 1 is an embodiment of a Java™ network application environment.

FIG. 1 is a block diagram illustrating a sample Java™ network environment comprising a client platform 102 coupled over a network 101 to a server 100 for the purpose of accessing Java™ class files for execution of a Java™ application or applet.

In FIG. 1, server 100 comprises Java™ development environment 104 for use in creating the Java™ class files for a given application. The Java™ development environment 104 provides a mechanism, such as an editor and an applet viewer, for generating class files and previewing applets. A set of Java™ core classes 103 comprise a library of Java classes that can be referenced by source files containing other/new Java™ classes. From Java™ development environment 104, one or more Java™ source files 105 are generated. Java™ source files 105 contain the programmer readable class definitions, including data structures, method implementations and references to other classes. Java™ source files 105 are provided to Java™ compiler 106, which compiles Java™ source files 105 into compiled ".class" files 107 that contain bytecodes executable by a Java™ virtual machine. Bytecode class files 107 are stored (e.g., in temporary or permanent storage) on server 100, and are available for download over network 101.

Client platform 102 contains a Java™ virtual machine JVM) 111 which, through the use of available native operating system (O/S) calls 112, is able to execute bytecode class files and execute native O/S calls when necessary during execution.

Java™ class files are often identified in applet tags within an HTML (hypertext markup language) document. A web server application 108 is executed on server 100 to respond to HTTP (hypertext transport protocol) requests containing URLs (universal resource locators) to HTML documents, also referred to as "web pages." When a browser application executing on client platform 102 requests an HTML document, such as by forwarding URL 109 to web server 108, the browser automatically initiates the download of the class files 107 identified in the applet tag of the HTML document. Class files 107 are typically downloaded from the server and loaded into virtual machine 111 individually as needed.

It is typical for the classes of a Java™ program to be loaded as late during the program's execution as possible; they are loaded on demand from the network (stored on a server), or from a local file system, when first referenced during the Java™ program's execution. The virtual machine locates and loads each class file, parses the class file format, allocates memory for the class's various components, and links the class with other already loaded classes. This process makes the code in the class readily executable by the virtual machine.

Embodiment of Computer Execution Environment

Figure 2:
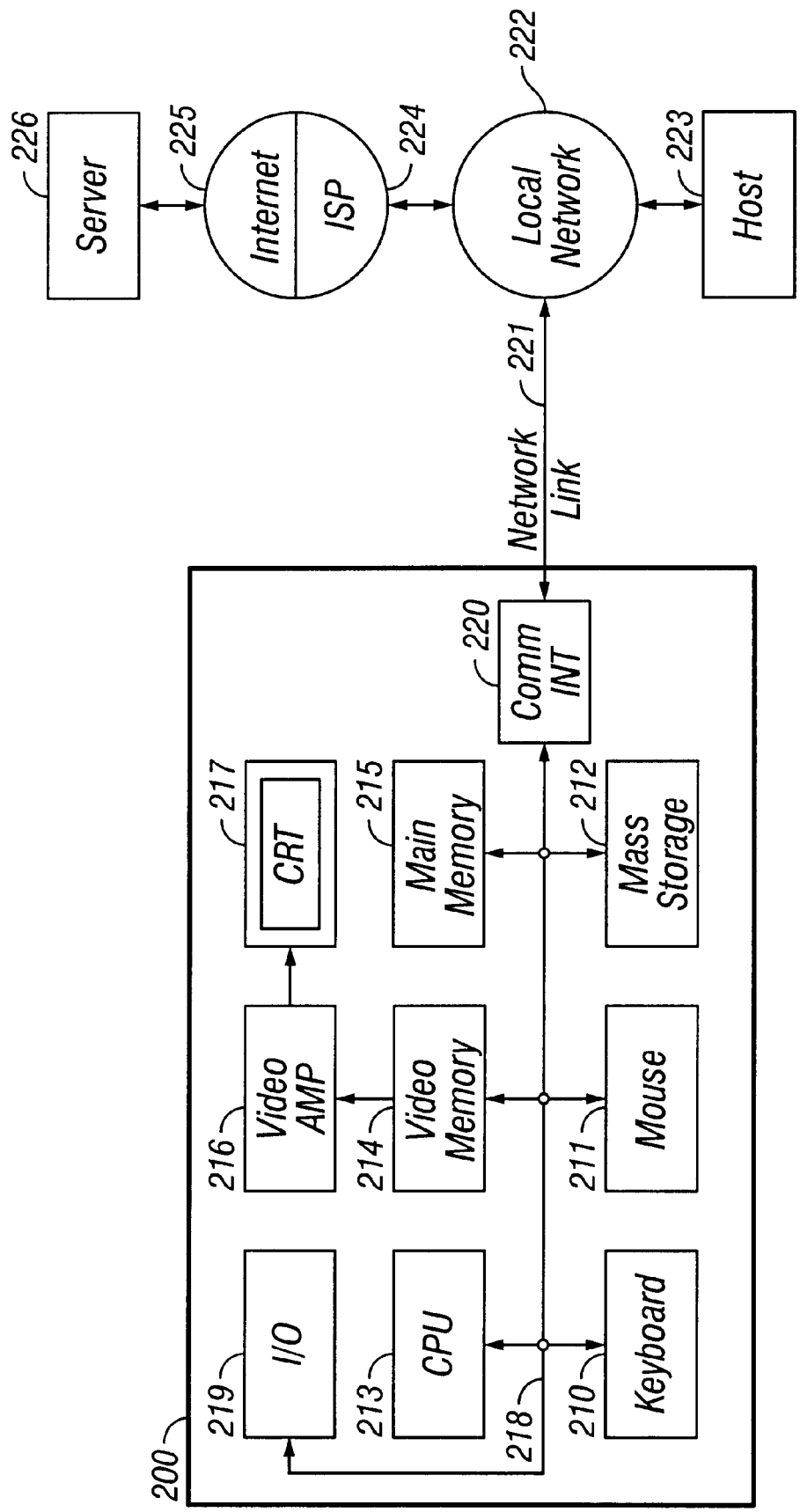
FIG. 2 is a block diagram of an embodiment of a computer system capable of providing a suitable execution environment for an embodiment of the invention.

An embodiment of the invention can be implemented as computer software in the form of computer readable program code executed on a general purpose computer such as computer 200 illustrated in FIG. 2, or in the form of bytecode class files executable by a virtual machine running on such a computer. A keyboard 210 and mouse 211 are coupled to a bi-directional system bus 218. The keyboard and mouse are for introducing user input to the computer system and communicating that user input to central processing unit (CPU) 213. Other suitable input devices may be used in addition to, or in place of, the mouse 211 and keyboard 210. I/O (input/output) unit 219 coupled to bidirectional system bus 218 represents such I/O elements as a printer, A/V (audio/video) I/O, etc.

Computer 200 includes a video memory 214, main memory 215 and mass storage 212, all coupled to bidirectional system bus 218 along with keyboard 210, mouse 211 and CPU 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as CPU 213, main memory 215, video memory 214 and mass storage 212. Alternatively, multiplex data/address lines may be used instead of separate data and address lines.

In one embodiment of the invention, the CPU 213 is a microprocessor manufactured by Motorola®, such as the 680X0 processor or a microprocessor manufactured by Intel®, such as the 80X86, or Pentium® processor, or a SPARC® microprocessor from Sun Microsystems®. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to host computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, server 226 might transmit a requested code for an application program through Internet 225, ISP 224, local network 222 and communication interface 220.

The received code may be executed by CPU 213 as it is received, and/or stored in mass storage 212, or other non-volatile storage for later execution. In this manner, computer 200 may obtain application code in the form of a carrier wave.

The computer systems described above are for purposes of example only. An embodiment of the invention may be implemented in any type of computer system or programming or processing environment.

Thus, a method and apparatus for providing timely delivery of a bytecode stream has been described in conjunction with one or more specific embodiments. The invention is defined by the claims and their full scope of equivalents.

We claim:

1. A method for delivery of bytecodes within a transport stream comprising:

obtaining media data for transmission to a client at a receiver station via a transport stream;

decomposing said media data into at least one primary packets, wherein each of said at least one primary packets comprises a primary packet header and a primary packet data;

decomposing said each of said at least one primary packets into a plurality of secondary packets of fixed length, each of said plurality of secondary packets having a transport stream header section and a transport stream payload section, wherein said transport stream comprises said plurality of secondary packets;

embedding bytecodes in said primary packet header of said primary packet;

decoding said transport stream at said receiver station to separate said bytecodes from said media data;

using said bytecodes to control playback of said media data at said receiver station.

2. The method of claim 1 wherein said transport stream header comprises an adaptation field section and a header section, and portions of said bytecodes are embedded in said adaptation field section.

3. The method of claim 2 wherein said transport stream payload section comprises a private stream field and portions of said bytecodes are embedded in said private stream field.

4. The method of claim 1 wherein said transport stream payload section comprises a private stream field and portions of said bytecodes are embedded in said private stream field.

5. A method for delivery of bytecodes within a transport stream comprising:
   obtaining media data for transmission to a client at a receiver station via a transport stream;
   decomposing said media data into at least one primary packets, wherein each of said at least one primary packets comprises a primary packet header and a primary packet data;
   decomposing said each of said at least one primary packets into a plurality of secondary packets of fixed length, each of said plurality of secondary packets having a transport stream header, section and a transport stream payload section, wherein said transport stream comprises said plurality of secondary packets;
   obtaining bytecodes necessary for controlling playback of said media data;
   decomposing said bytecodes into a plurality of bytecode packets, wherein each of said plurality of bytecode packets comprises a bytecode header and a class file;
   embedding said plurality of bytecode packets in said primary packet header of said primary packet;
   decoding said transport stream at said receiver station to separate said bytecodes from said media data;
   using said bytecodes to control playback of said media data at said receiver station.

6. A method for delivery of bytecodes within a transport stream comprising:
   obtaining media data for transmission to a client at a receiver station via a transport stream;
   decomposing said media data into at least one primary packets, each of said at least one primary packets having a primary packet header and a primary packet data, wherein said primary packet header comprising information for interpretation of said each of said at least one primary packets;
   decomposing said each of said at least one primary packets into a plurality of secondary packets of fixed length, each of said plurality of secondary packets having a transport stream header section and a transport stream payload section, wherein said transport stream comprises said plurality of secondary packets;
   obtaining bytecodes necessary for controlling playback of said media data;
   decomposing said bytecodes into a plurality of bytecode packets, wherein each of said plurality of bytecode packets comprises a bytecode header and a class file, said bytecode header having version identification, tune in point for a decoder, and retransmission time for said class file;
   embedding said plurality of bytecode packets in said primary packet header of said primary packet;
   decoding said transport stream at said receiver station to separate said bytecodes from said media data;
   using said bytecodes to control playback of said media data at said receiver station.

7. The method of claim 6, wherein said information for interpretation comprises:
   length of said header;
   version identification;
   type of data in said at least one primary packets;
   plurality of time stamps;
   size of said at least one primary packets;
   type of compression used;
   security scheme used; and
   error correction method.

8. A system comprising:
   a computer at a transmitting station having a processor, a memory, code executed by said processor configured to deliver bytecodes to a client at a receiver station via a transport stream; said code comprising:
      a method for decomposing said media data into at least one primary packets, wherein each of said at least one primary packets comprises a primary packet header and a primary packet data;
      a method for decomposing said each of said at least one primary packets into a plurality of secondary packets of fixed length, each of said plurality of secondary packets having a transport stream header section and a transport stream payload section, wherein said transport stream comprises said plurality of secondary packets;
      a method for embedding bytecodes in said primary packet header of said primary packet;
   a computer at a receiving station configured to:
      decode said transport stream at said receiver station to separate said bytecodes from said media data; and
      use said bytecodes to control playback of said media data at said receiver station.

9. The system of claim 8 wherein said transport stream header comprises an adaptation field section and a header section and portions of said bytecodes are embedded in said adaptation field section.

10. The system of claim 9, wherein said transport stream payload section comprises a private stream field and portions of said bytecodes are embedded in said private stream field.

11. The system of claim 8, wherein said transport stream payload section comprises a private stream field and portions of said bytecodes are embedded in said private stream field.

12. A system comprising:
   a computer at a transmitting station having a processor, a memory, code executed by said processor configured to deliver bytecodes within a transport stream; said code comprising:
      a method for obtaining media data for transmission to a client at a receiver station via a transport stream;
      a method for decomposing said media data into at least one primary packets, wherein each of said at least one primary packets comprises a primary packet header and a primary packet data;
      a method for decomposing said each of said at least one primary packets into a plurality of secondary packets of fixed length, each of said plurality of secondary packets having a transport stream header section and a transport stream payload section, wherein said transport stream comprises said plurality of secondary packets;

a method for obtaining bytecodes necessary for controlling playback of said media data;
a method for decomposing said byteclodes into a plurality of bytecode packets, wherein each of said plurality of bytecode packets comprises a bytecode header and a class file;
a method for embedding said plurality of bytecode packets in said primary packet header of said primary packet;
a computer at said receiving station configured to:
decode said transport stream at said receiver station to separate said bytecodes from said media data;
use said bytecodes to control playback of said media data at said receiver station.

13. A system comprising:
a computer at a transmitting station having a processor, a memory, code executed by said processor configured to deliver bytecodes within a transport stream; said code comprising:
a method for obtaining media data for transmission to a client at a receiver station via a transport stream;
a method for decomposing said media data into at least one primary packets, each of said at least one primary packets having a primary packet header and a primary packet data, wherein said primary packet header comprising information for interpretation of said each of said at least one primary packets;
a method for decomposing said each of said at least one primary packets into a plurality of secondary packets of fixed length, each of said plurality of secondary packets having a transport stream header section and a transport stream payload section, wherein said transport stream comprises said plurality of secondary packets;
a method for obtaining bytecodes necessary for controlling playback of said media data;
a method for decomposing said bytecodes into a plurality of bytecode packets, wherein each of said plurality of bytecode packets comprises a bytecode header and a class file, said bytecode header having version identification, tune in point for a decoder, and retransmission time for said class file;
a method for embedding said plurality of bytecode packets in said primary packet header of said primary packet;
a computer at a receiving station configured to:
decode said transport stream at said receiver station to separate said bytecodes from said media data;
use said bytecodes to control playback of said media data at said receiver station.

14. The system of claim 13, wherein said information for interpretation comprises:
length of said header;
version identification;
type of data in said at least one primary packets;
plurality of time stamps;
size of said at least one primary packets;
type of compression used;
security scheme used; and
error correction method.

15. A computer program product comprising:
a computer usable medium having computer readable program code embodied therein for delivery of bytecodes within a transport stream; said computer readable program code configured to cause a computer to:
obtain media data for transmission to a client at a receiver station via a transport stream;
decompose said media data into at least one primary packets, wherein each of said at least one primary packets comprises a primary packet header and a primary packet data;
decompose said each of said at least one primary packets into a plurality of secondary packets of fixed length, each of said plurality of secondary packets having a transport stream header section and a transport stream payload section, wherein said transport stream comprises said plurality of secondary packets;
embed bytecodes in said primary packet header of said primary packet;
decode said transport stream at said receiver station to separate said bytecodes from said media data;
use said bytecodes to control playback of said media data at said receiver station.

16. The computer program product of claim 15 wherein said transport stream header comprises an adaptation field section and a header section and portions of said bytecodes are embedded in said adaptation field section.

17. The computer program product of claim 16, wherein said transport stream payload section comprises a private stream field and portions of said bytecodes are embedded in said private stream field.

18. The computer program product of claim 15, wherein said transport stream payload section comprises a private stream field and portions of said bytecodes are embedded in said private stream field.

19. A computer program product comprising:
a computer usable medium having computer readable program code embodied therein for delivery of bytecodes within a transport stream; said computer readable program code configured to cause a computer to:
obtain media data for transmission to a client at a receiver station via a transport stream;
decompose said media data into at least one primary packets, wherein each of said at least one primary packets comprises a primary packet header and a primary packet data;
decompose said each of said at least one primary packets into a plurality of secondary packets of fixed length, each of said plurality of secondary packets having a transport stream header section and a transport stream payload section, wherein said transport stream comprises said plurality of secondary packets;
obtain bytecodes necessary for controlling playback of said media data;
decompose said bytecodes into a plurality of bytecode packets, wherein each of said plurality of bytecode packets comprises a bytecode header and a class file;
embed said plurality of bytecode packets in said primary packet header of said primary packet;
decode said transport stream at said receiver station to separate said bytecodes from said media data;
use said bytecodes to control playback of said media data at said receiver station.

20. A computer program product comprising:
a computer usable medium having computer readable program code embodied therein for delivery of bytecodes within a transport stream; said computer readable program code configured to cause a computer to:
obtain media data for transmission to a client at a receiver station via a transport stream;

decompose said media data into at least one primary packets, each of said at least one primary packets having a primary packet header and a primary packet data, wherein said primary packet header comprising information for interpretation of said each of said at least one primary packets;

decompose said each of said at least one primary packets into a plurality of secondary packets of fixed length, each of said plurality of secondary packets having a transport stream header section and a transport stream payload section, wherein said transport stream comprises said plurality of secondary packets;

obtain bytecodes necessary for controlling playback of said media data;

decompose said bytecodes into a plurality of bytecode packets, wherein each of said plurality of bytecode packets comprises a bytecode header and a class file, said bytecode header having version identification, tune in point for a decoder, and retransmission time for said class file;

embed said plurality of bytecode packets in said primary packet header of said primary packet;

decode said transport stream at said receiver station to separate said bytecodes from said media data;

use said bytecodes to control playback of said media data at said receiver station.

21. The computer program product of claim 20, wherein said information for interpretation comprises:

length of said header;

version identification;

type of data in said at least one primary packets;

plurality of time stamps;

size of said at least one primary packets;

type of compression used;

security scheme used; and error correction method.

* * * * *